(12) United States Patent
Húserka et al.

(10) Patent No.: US 12,104,762 B1
(45) Date of Patent: Oct. 1, 2024

(54) LIGHTING DEVICE FOR VEHICLE

(71) Applicant: ZKW Group GmbH, Wieselburg (AT)

(72) Inventors: Pavol Húserka, Skalka nad Váhom (SK); David Mozny, Plumlov (CZ); Michal Hub, Nový Jičín (CZ); Michal Faltus, Práznovce (SK); Jiří Navrátil, Nový Jičín (CZ)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/597,237

(22) Filed: Mar. 6, 2024

(30) Foreign Application Priority Data

Mar. 8, 2023 (EP) ..................................... 23160752

(51) Int. Cl.
| | | |
|---|---|---|
| F21S 45/47 | (2018.01) | |
| F21S 43/19 | (2018.01) | |
| F21S 43/241 | (2018.01) | |
| F21S 43/243 | (2018.01) | |

(52) U.S. Cl.
CPC ........... F21S 43/241 (2018.01); F21S 43/195 (2018.01); F21S 43/243 (2018.01); F21S 45/47 (2018.01)

(58) Field of Classification Search
CPC ...... F21S 43/241; F21S 43/195; F21S 43/243; F21S 45/47
See application file for complete search history.

(56) References Cited

U.S. PATENT DOCUMENTS

| | | |
|---|---|---|
| 2017/0219178 A1 | 8/2017 | Faffelberger et al. |
| 2020/0340640 A1 | 10/2020 | Min |
| 2021/0162910 A1* | 6/2021 | Hechenberger ...... B60Q 1/0011 |
| 2023/0028522 A1* | 1/2023 | Heitjohann ............. F21S 43/31 |
| 2023/0160555 A1* | 5/2023 | Maier ..................... F21S 43/26 362/459 |

(Continued)

FOREIGN PATENT DOCUMENTS

| | | |
|---|---|---|
| CN | 211600570 U | 9/2020 |
| CN | 217843730 U | 11/2022 |

(Continued)

OTHER PUBLICATIONS

English translation of Peron WO-2020245523-A1 (Year: 2020).*
Extended European Search Report for European Patent Application No. 23160752.4 dated May 31, 2023 (10 Pages).

*Primary Examiner* — Evan P Dzierzynski
(74) *Attorney, Agent, or Firm* — Eversheds Sutherland (US) LLP (57) ABSTRACT

A lighting device for a vehicle configured to create a segmented light function. The device includes a holding frame, a light source holder having first and second light source groups mounted thereto; and at least two optical elements. The light source holder, the first optical element (FOE), and the second optical element (SOE) are configured to be mounted to the holding frame. The FOE has a first protrusion, and the SOE has a second protrusion, and the holding frame includes first and second receiving elements configured to receive the first and second protrusions, respectively. The holding frame includes a first stopping element configured to engage a first contact surface of the FOE and a second stopping element configured to engage a second contact surface of the SOE. The lighting device further includes a cover element configured to secure the FOE and SOE against movement opposite to a main beam direction.

15 Claims, 2 Drawing Sheets

(56) References Cited

U.S. PATENT DOCUMENTS

2023/0347818 A1* 11/2023 Dekievit ................ B60K 35/50

FOREIGN PATENT DOCUMENTS

| EP | 2372235 | A2 | 10/2011 | | |
|----|---------|----|---------|---|---|
| EP | 3453947 | A1 | 3/2019 | | |
| FR | 3097026 | A1 | 12/2020 | | |
| WO | 2012132882 | A1 | 10/2012 | | |
| WO | WO-2020245523 | A1 * | 12/2020 | ............ | F21S 43/239 |

* cited by examiner

LIGHTING DEVICE FOR VEHICLE

CROSS-REFERENCE TO RELATED APPLICATIONS

This application claims priority to European Patent Application No. 23160752.4, filed Mar. 8, 2023, which is incorporated herein by reference.

FIELD OF THE INVENTION AND DESCRIPTION OF PRIOR ART

The invention relates to a lighting device for a vehicle, said lighting device is configured to create a segmented light function, in particular a segmented signal light, composed of at least two segments, said lighting device comprises:
- a holding frame with a longitudinal extension limited by a proximal end portion and a distal end portion opposite of the proximal end portion,
- a light source holder having a first light source group and a second light source group mounted thereto, wherein each light source group is configured to emit light along a, preferably common, main beam direction,
- at least two optical elements, wherein
- a first optical element comprises a light receiving surface, a light emitting surface and a lateral surface, extending between the light receiving surface and the light emitting surface, said lateral surface of the first optical element has a longitudinal extension, and
- a second optical element comprises a light receiving surface, a light emitting surface and a lateral surface, extending between the light receiving surface and the light emitting surface, said lateral surface of the second optical element has a longitudinal extension, wherein the light source holder, the first optical element and the second optical element are configured to be mounted to the holding frame in a mounting position, in which
the light source holder is disposed at the proximal end portion of the holding frame such that the main beam direction of the light source groups is oriented along the longitudinal extension of the holding frame,
the light receiving surface of the first optical element and the light receiving surface of the second optical element are disposed at the proximal end portion of the holding frame, such that light from the first light source group is emitted towards the light receiving surface of the first optical element and light from the second light source group is emitted towards the light receiving surface of the second optical element, wherein light received via the light receiving surface of the first optical element traverses through the first optical element and gets emitted via the light emitting surface of the first optical element, and wherein light received via the light receiving surface of the second optical element traverses through the second optical element and gets emitted via the light emitting surface of the second optical element,
the longitudinal extension of the lateral surface of the first optical element and the longitudinal extension of the lateral surface of the second optical element extend along the main beam direction respectively, and
the light emitting surface of the first optical element and the light emitting surface of the second optical element are disposed at the distal end portion of the holding frame,
wherein the holding frame is configured to secure the first optical element and the second optical element in the mounting position, such that
the first optical element and the second optical element are secured against a movement along the main beam direction beyond the mounting position and along a direction in a plane perpendicular to the main beam direction, and
the first optical element and the second optical element are spaced relative to each other by a gap, which is defined as a normal distance between the lateral surface of the first optical element and the lateral surface of the second optical element.

The invention also relates to a vehicle lamp, in particular a vehicle turn signal lamp, a vehicle headlamp or a vehicle taillamp, comprising a lighting device.

In the prior art lighting devices for vehicles, which are configured to create segmented light functions, in particular segmented signal lights, are well known. Usually, each segment of the segmented light function is created by a specific optical element (e.g. thick wall optics, which guide light via total internal reflexion towards a light emitting surface of the thick wall optic). In order to have a clean distinction between individual light segments, it is known to either have a relatively large gap between individual optical elements, or to dispose shielding elements or blinds between optical elements along the direction of light propagation. By installing blinds or applying large gaps, light from different optical elements can be distinguished more easily by an observer, resulting in a sharp and crisp visualization of the individual segments of the segmented light function. However, blinds and shielding elements make the entire lighting device more complex and such parts are difficult to apply and fixate in a vehicle lamp, because vehicle lamps are subject to vibrations and other mechanical forces. The alternative of having a rather large gap between individual optical elements deteriorates the optical impression of a holistic light function, which is being compiled of multiple segments.

SUMMARY OF THE INVENTION

It is an object of the invention to provide a lighting device for a vehicle, which is capable of creating a segmented light function and at the same has an improved, simplified construction.

To achieve this object a lighting device according to claim 1 is provided. Preferred embodiments are described in the depended claims.

According to a first aspect of the invention, the first optical element comprises a first protrusion, extending away from the lateral surface of the first optical element, and the second optical element comprises at least one second protrusion, extending away from the lateral surface of the second optical element, wherein
the holding frame comprises a first receiving element and a second receiving element, wherein the first receiving element is configured to receive the first protrusion of the first optical element and the second receiving element is configured to receive the second protrusion of the second optical element, wherein when the first protrusion is received by the first receiving element and the second protrusion is received by the second receiving element the first optical element and the second optical element are moveable along the main direction and immovable along a plane perpendicular to the main beam direction, wherein the holding frame comprises at least one first stopping element configured to engage with a first contact surface of the first optical element and at least one second stopping element configured to engage with a second contact surface of the second optical element, wherein in the mounting position, the stopping element engages with the first contact surface and the second stopping element engages with the second contact surface, such that a movement of the first optical element and the second optical element along the main beam direction beyond the mounting position is blocked, wherein the lighting device further comprises a cover element, wherein in the mounting position, the cover element is mounted to the proximal end portion of the holding frame via mounting means, wherein the cover element is configured to secure the first optical element and the second optical element against a movement along a direction opposite to the main beam direction.

This has the advantage, that the first optical element and the second optical element are both secured (or fixed) along the direction of light propagation (the main beam direction), along a direction opposite to the direction of light propagation, and also along a (essentially vertical) plane, which is perpendicular to the direction of light propagation. Another advantage of the invention is, that the mounting position can be established in a convenient way, because the first optical element and the second optical element can slide along the main beam direction within the confined space defined by the frame element (which can also be described as a longitudinal hull or shell element) in order to arrive at the mounting position. The first receiving element, the second receiving element, the first stopping element, the second stopping and the cover element together advantageously provide a fixation of the first optical element and the second optical element within the frame element. Preferably, the lateral surface of the first optical element limits the first optical element in a direction orthogonal to the main beam direction, and the later surface of the second optical element limits the second optical element in a direction orthogonal to the main beam direction. The lighting device may comprise a third or more optical elements, wherein these additional optical elements may comprise protrusions equivalent to the first protrusion of the first optical element, furthermore, the frame element may comprise additional receiving elements, wherein each receiving element corresponds to a specific protrusion of a corresponding optical element. Each optical element may comprise two or more protrusions, wherein the frame element may comprise multiple receiving elements, wherein each receiving element corresponds to a specific protrusion and is configured to engage with its corresponding protrusion.

Advantageously, the holding frame further comprises at least one, preferably multiple, distance element, wherein in the mounting position the distance element is disposed at least partially between the first optical element and the second optical element and/or between the first optical element and the holding frame and/or between the second optical element and the holding frame, wherein the at least one distance element is configured to keep the gap between the first optical element and the second optical element and/or between the first optical element and the holding frame and/or between the second optical element and the holding frame, constant along the longitudinal extension of the first optical element, the longitudinal extension of the second optical element, and/or the longitudinal extension of the holding frame. This has the advantage of providing clear and distinguishable light segments. The distance elements may be disposed at the distal end portion or the proximal end portion of the frame element.

Advantageously, the holding frame is formed as a hollow body comprising an inner surface, said inner surface faces the first optical element and the second optical element in the mounting position, and an outer surface opposite to the inner surface, wherein the first receiving element is disposed at the inner surface of the hollow body and the second receiving element is disposed at the proximal end portion.

Advantageously, the first contact surface is formed at the first protrusion of the first optical element and the second contact surface is formed at the second protrusion of the second optical element. Preferably the first contact surface is oriented perpendicular to the main beam direction. Preferably the second contact surface is oriented perpendicular to the main beam direction.

Advantageously, the first receiving element is formed as a groove along the longitudinal extension of the holding frame and the second receiving element is formed as a receiving recess formed at the proximal end portion of the holding frame, wherein the first protrusion of the first optical element is formed corresponding to the groove, and the second protrusion of the second optical element is formed corresponding to the receiving recess.

Advantageously, in the mounting position the light source holder is disposed relative to the first optical element and the second optical element, such that the first optical element receives light only from the first light source group and the second optical element receives light only from the second light source group.

Advantageously, the light source holder comprises at least two reference elements and the first optical element and the second optical element each comprise at least one counter reference element respectively, wherein each counter reference element is configured to engage with a corresponding reference element of the light source holder, such that in the mounting position the engagement of the reference elements with corresponding counter reference elements secure the position of the light source holder relative to the first optical element and the second optical element respectively, preferably such that the first optical element receives light only from the first light source group and the second optical element receives light only from the second light source group. Advantageously, the cover element comprises additional reference elements, which are located on the cover element in specific positions, such that, in the mounting position, the additional reference elements align with the reference elements of the light source holder and the counter reference elements of the first optical element and the second optical element. Preferably, the reference elements and the additional elements are formed as through holes, and the counter reference elements are formed as spikes, wherein the shape of the spikes correspond to the shape of the through holes.

Advantageously, the first light source group and/or the second light source group comprises two different types of light sources disposed alternating to each other on the light source holder, wherein a first light source type is configured to emit white light, wherein a second light source type is configured to emit non-white, in particular amber, light. This has the advantage of providing a larger variety in the creatable segmented light functions.

Advantageously, the light receiving surface, the light emitting surface and the lateral surface of the first optical element and/or the second optical element form a transparent solid body respectively, wherein light received by the light receiving surface traverses within the solid body towards the light emitting surface via total internal reflection at the lateral surface.

Advantageously, in the mounting position the holding frame at least partially, preferably fully, surrounds the lateral surface of the first optical element and/or the lateral surface of the second optical element.

Advantageously, in the mounting position the longitudinal extension of the holding frame, the longitudinal extension of the first optical element and the longitudinal extension of the second optical element are essentially parallel to each other.

Advantageously, the cover element is configured as a cooling device, in particular a cooling plate, wherein in the mounting position the light source holder is disposed between the cover element and the first optical element and the second optical element, wherein the cover element is disposed at a light source averting backside of the light source holder and is configured to cool the first light source group and the second light source group. Preferably, the cover element comprises of a flat portion, to which cooling fins are mounted, wherein the flat portion is oriented perpendicular to the main beam direction in the mounting position and the fins are located on the light source averting backside of the flat portion.

Advantageously, in the mounting position the mounting means mount the cover element, and preferably the light source holder, to the holding frame, wherein the at least one second protrusion of the second optical element comprises a through hole, wherein in the mounting position the mounting means extend from the cover element through said through hole and into the receiving recess at the proximal end portion of the holding frame, wherein the receiving recess is configured to engage with the mounting means in order to fasten the position of the cover element, the second optical element, and preferably the light source holder, at the proximal end portion of the holding frame.

Advantageously, the light source holder is mounted to the cover element, wherein the light source holder comprises a, preferably flat, light source holding surface, to which the first light source group and the second light source group is mounted to, such that the first light source group and the second light source group are disposed in the same plane, wherein in the mounting position the light source holding surface is oriented essentially orthogonal to the main beam direction.

Advantageously, in order to establish the mounting position, the first optical element and the second optical element are configured to be moveable relative to the holding frame, preferably insertable into a holding portion of the holding frame, along an insertion direction, which is essentially parallel to the main beam direction.

Advantageously, in the mounting position the light emitting surface of the first optical element and the light emitting surface of the second optical element are disposed essentially in the same plane.

Advantageously, the first stopping element is disposed at a distal end portion of the first receiving element, in particular, the first stopping element may limit the longitudinal extension of the first receiving element along the main beam direction.

Advantageously, the second stopping element is disposed at the proximal end portion of the frame element, in particular, the second stopping element may limit the longitudinal extension of the second receiving element along the main beam direction.

According to another aspect of the invention, a vehicle lamp, in particular a vehicle turn signal lamp, a vehicle headlamp or a vehicle taillamp, is provided, comprising a lighting device according to the invention.

Terms indicating an orientation, like "horizontal", "vertical", "left", "right", etc., are to be understood as directions, when the lighting device is mounted to a vehicle head lamp that is installed in a vehicle in its designated position.

BRIEF DESCRIPTION OF THE DRAWINGS

In the following, in order to further demonstrate the present invention, illustrative and non-restrictive embodiments are discussed, as shown in the drawings, wherein.

DETAILED DESCRIPTION OF EMBODIMENTS OF THE INVENTION

Figure 1:
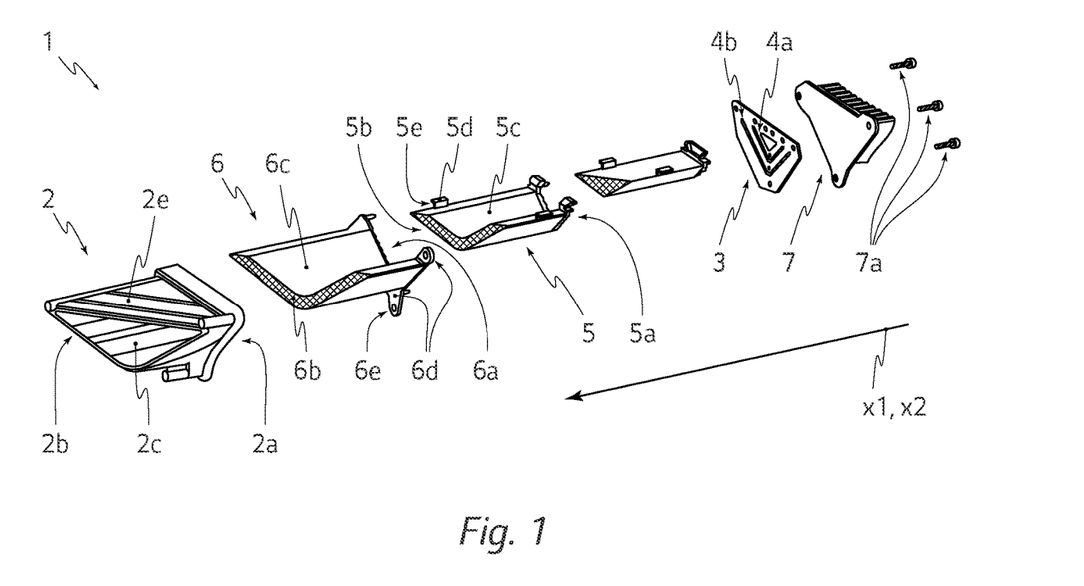
FIG. 1 shows an exploded view of a lighting device according to an embodiment of the invention.

FIG. 1 shows an exploded view of an embodiment of a lighting device 1 according to the invention. The lighting device is preferably for a vehicle, said lighting device 1 is configured to create a segmented light function, in particular a segmented signal light, composed of at least two segments.

The lighting device 1 comprises a holding frame 2 with a longitudinal extension limited by a proximal end portion 2a and a distal end portion 2b opposite of the proximal end portion 2a. The lighting device 1 comprises a light source holder 3 having a first light source group 4a and a second light source group 4b mounted thereto, wherein each light source group 4a, 4b is configured to emit light along a, preferably common, main beam direction x1. In the shown embodiment, the first light source group 4a and the second light source group 4b comprises two different types of light sources disposed alternating to each other on the light source holder 3. Preferably, a first light source type is configured to emit white light, wherein a second light source type is configured to emit non-white, in particular amber, light.

The lighting device 1 comprises at least two optical elements 5, 6. In the shown embodiment, three optical elements are shown. The third (and every additional) optical element is optional. A first optical element 5 comprises a light receiving surface 5a, a light emitting surface 5b and a lateral surface 5c, extending between the light receiving surface 5a and the light emitting surface 5b. The lateral surface 5c of the first optical element 5 has a longitudinal extension. A second optical element 6 also comprises a light receiving surface 6a, a light emitting surface 6b and a lateral surface 6c, extending between the light receiving surface 6a and the light emitting surface 6b. The lateral surface 6c of the second optical element 6 has a longitudinal extension. In the shown embodiment, the light receiving surfaces 5a, 6a, the light emitting surfaces 5b, 6b and the lateral surfaces 5c, 6c of the first optical element 5 and the second optical element 6 form a transparent solid body respectively. Light received by the light receiving surfaces 5a, 6a traverses within the respective solid body towards its light emitting surface 5b, 6b via total internal reflection at the respective lateral surface 5c, 6c.

The light source holder 3, the first optical element 5 and the second optical element 6 are configured to be mounted to the holding frame 2 in a mounting position. In the mounting position, the light source holder 3 is disposed at the proximal end portion 2a of the holding frame 2, such that the main beam direction x1 of the light source groups 4a, 4b is oriented along the longitudinal extension of the holding frame 2. In the mounting position the longitudinal extension of the holding frame 2, the longitudinal extension of the first optical element 5 and the longitudinal extension of the second optical element 6 are essentially parallel to each other.

Essentially, in the mounting position the holding frame 2 at least partially, preferably fully, surrounds the lateral surface 5c of the first optical element 5 and/or the lateral surface 6c of the second optical element 6, as a shell-like structure.

The light receiving surface 5a of the first optical element 5 and the light receiving surface 6a of the second optical element 6 are disposed at the proximal end portion 2a of the holding frame 2, such that light from the first light source group 4a is emitted towards the light receiving surface 5a of the first optical element 5 and light from the second light source group 4b is emitted towards the light receiving surface 6a of the second optical element 6, in order to form a segmented light function. For this purpose, light received via the light receiving surface 5a of the first optical element 5 traverses through the first optical element 5 and gets emitted via the light emitting surface 5b of the first optical element 5 and light received via the light receiving surface 6a of the second optical element 6 traverses through the second optical element 6 and gets emitted via the light emitting surface 6b of the second optical element 6. The longitudinal extension of the lateral surface 5c of the first optical element 5 and the longitudinal extension of the lateral surface 6c of the second optical element 6 extend along the main beam direction x1 respectively. Furthermore, in the mounting position the light source holder 3 is disposed relative to the first optical element 5 and the second optical element 6, such that the first optical element 5 receives light exclusively from the first light source group 4a and the second optical element 6 receives light exclusively from the second light source group 4b.

The light emitting surface 5b of the first optical element 5 and the light emitting surface 6b of the second optical element 6 are disposed at the distal end portion 2b of the holding frame 2. Furthermore, in the shown embodiment, in the mounting position the light emitting surface 5b of the first optical element 5 and the light emitting surface 6b of the second optical element 6 are disposed essentially in the same, preferably vertical, plane.

The holding frame 2 is configured to secure the first optical element 5 and the second optical element 6 in the mounting position, such that the first optical element 5 and the second optical element 6 are secured against a movement along the main beam direction x1 beyond the mounting position and along a direction in a plane perpendicular to the main beam direction x1. Furthermore, the first optical element 5 and the second optical element 6 are spaced relative to each other by a gap, which is defined as a normal distance between the lateral surface 5c of the first optical element 5 and the lateral surface 6c of the second optical element 6.

In order to establish the secured connection of the first optical element 5 and the second optical element 6 within the holding frame 2, the first optical element 5 comprises a first protrusion 5d, extending away from the lateral surface 5c of the first optical element 5 and the second optical element 6 comprises at least one second protrusion 6d, extending away from the lateral surface 6c of the second optical element 6. The holding frame 2 comprises a first receiving element 2d1 and a second receiving element 2d2. The first receiving element 2d1 is configured to receive the first protrusion 5d of the first optical element 5 and the second receiving element 2d2 is configured to receive the second protrusion 6d of the second optical element 6. When the first protrusion 5d is received by the first receiving element 2d1 and the second protrusion 6d is received by the second receiving element 2d2 the first optical element 5 and the second optical element 6 are moveable (or slidable) along the main direction x and immovable along a plane perpendicular to the main beam direction x1.

The holding frame 2 further comprises a first stopping element 2f1 configured to engage with a first contact surface 5e of the first optical element 5 and a second stopping element 2f2 configured to engage with a second contact surface 6e of the second optical element 6. In the mounting position, the first stopping element 2f1 engages with the first contact surface 5e and the second stopping element 2f2 engages with the second contact surface 6e, such that a movement of the first optical element 5 and the second optical element 6 along the main beam direction x1 beyond the mounting position is blocked.

The lighting device 1 further comprises a cover element 7, wherein in the mounting position, the cover element 7 is mounted to the proximal end portion 2a of the holding frame 2 via mounting means 7a. The cover element 7 is configured to secure the first optical element 5 and the second optical element 6 against a movement along a direction opposite to the main beam direction x1.

In the shown embodiment, the cover element 7 is configured as a cooling device, in particular a cooling plate, wherein in the mounting position the light source holder 3 is disposed between the cover element 7 and the first optical element 5 and the second optical element 6. The cover element 7 is disposed at a light source averting backside of the light source holder 3 and is configured to cool the first light source group 4a and the second light source group 4b.

In the mounting position the mounting means 7a mount the cover element 7, and preferably the light source holder 3, to the holding frame 2. The at least one second protrusion 6d of the second optical element 6 comprises a through hole. In the mounting position the mounting means 7a extend from the cover element 7 through said through hole and into the receiving recess at the proximal end portion 2a of the holding frame 2. The receiving recess is configured to engage with the mounting means 7a in order to fasten the position of the cover element 7, the second optical element 6, and preferably the light source holder 3, at the proximal end portion 2a of the holding frame 2.

The light source holder 3 may be mounted to the cover element 7. The light source holder 3 comprises a, preferably flat, light source holding surface, to which the first light source group 4a and the second light source group 4b is mounted to, such that the first light source group 4a and the second light source group 4b are disposed in the same plane. In the mounting position the light source holding surface is oriented essentially orthogonal to the main beam direction x1.

Figure 3:
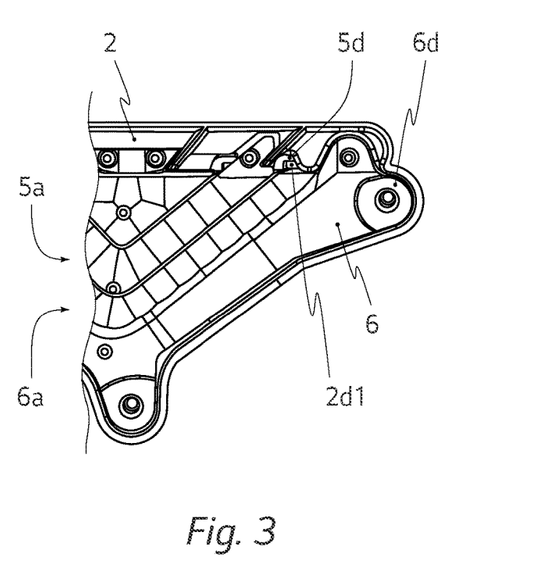
FIG. 3 shows a partial back view of the assembled lighting device of FIG. 1 without a light source holder and a cover element.

FIG. 3 shows a partial back view of the assembled lighting device 1, without the light source holder 3 and the cover element 7 mounted thereto.

Figure 5:
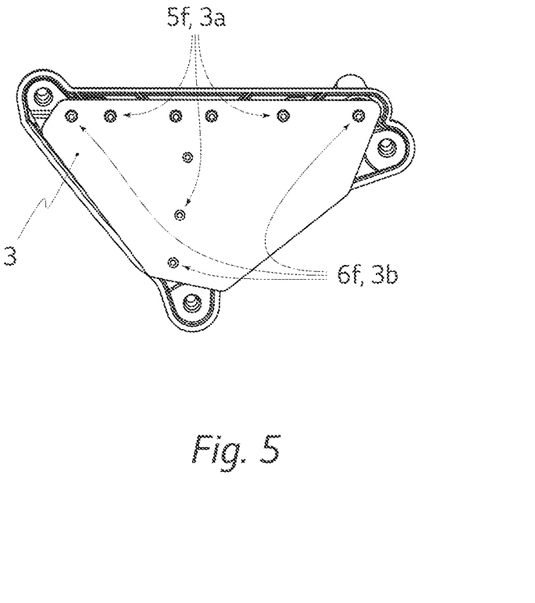
FIG. 5 shows a back view of the assembled lighting device of FIG. 1 without a cover element.

FIG. 5 shows the lighting device 1 with the light source holder 3 mounted to the proximal end portion 2a of the frame element 2, without the cover element 7 mounted thereto.

Figure 2:
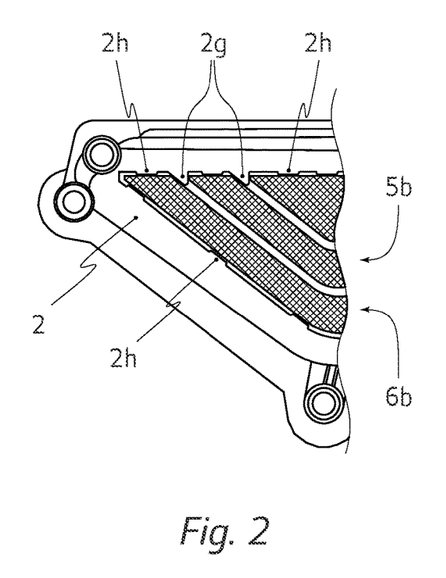
FIG. 2 shows a partial front view of the assembled lighting device of FIG. 1.

FIG. 2 shows a partial front view, wherein the light emitting surface 5b of the first optical element 5 and the light emitting surface 6b of the second optical element 6 is depicted. Between the first optical element 5 and the second optical element 6 and the frame element 2 are distance elements 2g and additional distance elements 2h. In the mounting position the distance elements 2g, 2h are disposed at least partially between the first optical element 5 and the second optical element 6 and between the first optical element 5 and the holding frame 2 and between the second optical element 6 and the holding frame 2. The distance elements 2g, 2h are configured to keep the gap between the first optical element 5 and the second optical element 6 and between the first optical element 5 and the holding frame 2 and between the second optical element 6 and the holding frame 2, constant along the longitudinal extension of the first optical element 5, the longitudinal extension of the second optical element 6, and the longitudinal extension of the holding frame 2.

Figure 4:
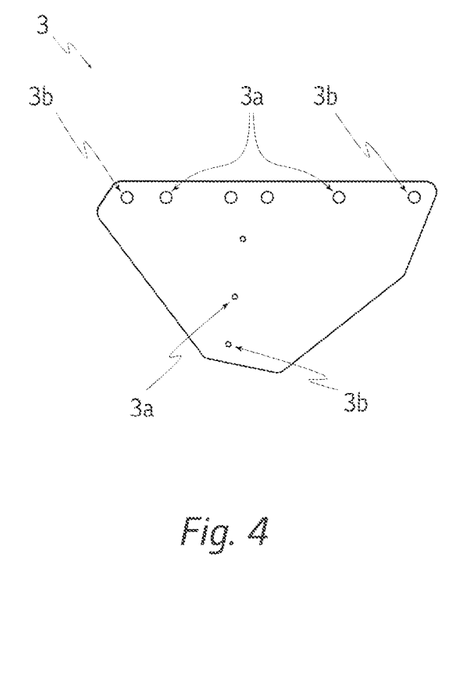
FIG. 4 shows a light source holder.
Figure 6:
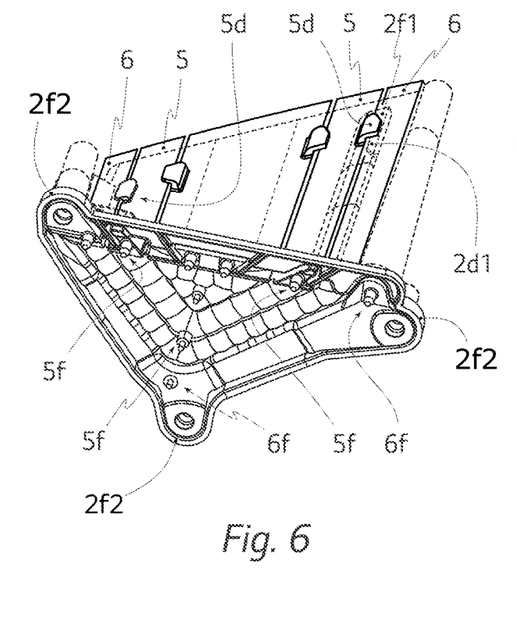
FIG. 6 shows another back side perspective of the assembled lighting device of FIG. 1 without a cover element and a light source holder.

As depicted in FIG. 6 and in more detail in FIG. 4 and FIG. 5, the light source holder 3 comprises multiple reference elements 3a, 3b and the first optical element 5 and the second optical element 6 each comprise multiple counter reference element 5f, 6f respectively. Each counter reference element 5f, 6f is configured to engage with a corresponding reference element 3a, 3b of the light source holder 3, such that in the mounting position the engagement of the reference elements 3a, 3b with corresponding counter reference elements 5f, 6f secure the position of the light source holder 3 relative to the first optical element 5 and the second optical element 6 respectively.

Figure 7:
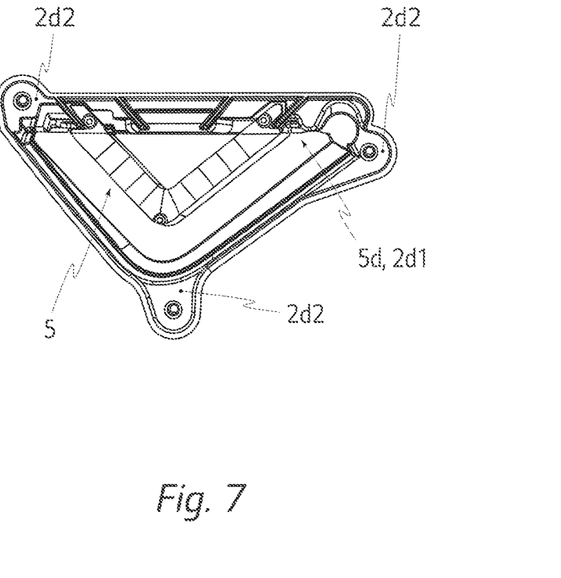
FIG. 7 shows a frame element with a first optical element.

As can be seen in FIG. 7, in the shown embodiment, the holding frame 2 is formed as a hollow body comprising an inner surface 2c, said inner surface 2c faces the first optical element 5 and the second optical element 6 in the mounting position, and an outer surface 2e opposite to the inner surface 2c. The first receiving element 2d1 is disposed at the inner surface 2c of the hollow body and the second receiving element 2d2 is disposed at the proximal end portion 2a.

In the shown embodiment, the first receiving element 2d1 is formed as a groove along the longitudinal extension of the holding frame 2 and the second receiving element 2d2 is formed as a receiving recess formed at the proximal end portion 2a of the holding frame 2. The first protrusion 5d of the first optical element 5 is formed corresponding to the groove, and the second protrusion 6d of the second optical element 6 is formed corresponding to the receiving recess. The first stopping element 2f1 is the end portion of the groove, the second stopping element 2f2 is the end portion of the receiving recess. In the shown embodiment, the first contact surface 5e is formed at the first protrusion 5d of the first optical element 5 and the second contact surface 6e is formed at the second protrusion 6d of the second optical element 6.

In order to establish the mounting position, the first optical element 5 and the second optical element 6 are configured to be moveable relative to the holding frame 2, preferably insertable into a holding portion of the holding frame 2, along an insertion direction x2, which is essentially parallel to the main beam direction x1.

LIST OF REFERENCE SIGNS 1 lighting device
2 holding frame
2a proximal end portion
2b distal end portion
2c inner surface
2d1 first receiving element
2d2 second receiving element
2e outer surface
2f1 first stopping element
2f2 second stopping element
2g, 2h distance elements
3 light source holder
3a, 3b reference elements
4a first light source group
4b second light source group
5 first optical element
5a light receiving surface
5b light emitting surface
5c lateral surface
5d first protrusion
5e first contact surface
5f counter reference element
6 second optical element
6a light receiving surface
6b light emitting surface
6c lateral surface
6d second protrusion
6e second contact surface
6f counter reference element
7 cover element
7a mounting means
x1 main beam direction
x2 insertion direction

The invention claimed is:

1. A lighting device (1) for a vehicle, wherein the lighting device (1) is configured to create a segmented light function, in particular a segmented signal light, composed of at least two segments, the lighting device (1) comprising:
   a holding frame (2) with a longitudinal extension limited by a proximal end portion (2a) and a distal end portion (2b) opposite of the proximal end portion (2a);
   a light source holder (3) having a first light source group (4a) and a second light source group (4b) mounted thereto, wherein each light source group (4a, 4b) is configured to emit light along a, preferably common, main beam direction (x1); and
   at least two optical elements (5, 6), wherein:
      a first optical element (5) comprises a light receiving surface (5a), a light emitting surface (5b) and a lateral surface (5c), extending between the light receiving surface (5a) and the light emitting surface (5b), said lateral surface (5c) of the first optical element (5) has a longitudinal extension, and
      a second optical element (6) comprises a light receiving surface (6a), a light emitting surface (6b) and a lateral surface (6c), extending between the light receiving surface (6a) and the light emitting surface (6b), said lateral surface (6c) of the second optical element (6) has a longitudinal extension,
   wherein the light source holder (3), the first optical element (5) and the second optical element (6) are configured to be mounted to the holding frame (2) in a mounting position, in which
      the light source holder (3) is disposed at the proximal end portion (2a) of the holding frame (2) such that the main beam direction (x1) of the light source groups (4a, 4b) is oriented along the longitudinal extension of the holding frame (2), the light receiving surface (5a) of the first optical element (5) and the light receiving surface (6a) of the second optical element (6) are disposed at the proximal end portion (2a) of the holding frame (2), such that light from the first light source group (4a) is emitted towards the light receiving surface (5a) of the first optical element (5) and light from the second light source group (4b) is emitted towards the light receiving surface (6a) of the second optical element (6), wherein light received via the light receiving surface (5a) of the first optical element (5) traverses through the first optical element (5) and gets emitted via the light emitting surface (5b) of the first optical element (5), and wherein light received via the light receiving surface (6a) of the second optical element (6) traverses through the second optical element (6) and gets emitted via the light emitting surface (6b) of the second optical element (6), the longitudinal extension of the lateral surface (5c) of the first optical element (5) and the longitudinal extension of the lateral surface (6c) of the second optical element (6) extend along the main beam direction (x1) respectively, and the light emitting surface (5b) of the first optical element (5) and the light emitting surface (6b) of the second optical element (6) are disposed at the distal end portion (2b) of the holding frame (2); and wherein the holding frame (2) is configured to secure the first optical element (5) and the second optical element (6) in the mounting position, such that the first optical element (5) and the second optical element (6) are secured against a movement along the main beam direction (x1) beyond the mounting position and along a direction in a plane perpendicular to the main beam direction (x1), and such that the first optical element (5) and the second optical element (6) are spaced relative to each other by a gap, which is defined as a normal distance between the lateral surface (5c) of the first optical element (5) and the lateral surface (6c) of the second optical element (6), wherein:

the first optical element (5) comprises a first protrusion (5d), extending away from the lateral surface (5c) of the first optical element (5), and the second optical element (6) comprises a second protrusion (6d), extending away from the lateral surface (6c) of the second optical element (6), the holding frame (2) comprises a first receiving element (2d1) and a second receiving element (2d2), wherein the first receiving element (2d1) is configured to receive the first protrusion (5d) of the first optical element (5) and the second receiving element (2d2) is configured to receive the second protrusion (6d) of the second optical element (6), wherein when the first protrusion (5d) is received by the first receiving element (2d1) and the second protrusion (6d) is received by the second receiving element (2d2) the first optical element (5) and the second optical element (6) are moveable along the main direction (x) and immovable along a plane perpendicular to the main beam direction (x1), the holding frame (2) comprises a first stopping element (2f1) configured to engage with a first contact surface (5e) of the first optical element (5) and a second stopping element (2f2) configured to engage with a second contact surface (6e) of the second optical element (6), wherein in the mounting position, the first stopping element (2f1) engages with the first contact surface (5e) and the second stopping element (2f2) engages with the second contact surface (6e), such that a movement of the first optical element (5) and the second optical element (6) along the main beam direction (x1) beyond the mounting position is blocked, the lighting device (1) further comprises a cover element (7), wherein in the mounting position, the cover element (7) is mounted to the proximal end portion (2a) of the holding frame (2) via mounting means (7a), wherein the cover element (7) is configured to secure the first optical element (5) and the second optical element (6) against a movement along a direction opposite to the main beam direction (x1).

2. The lighting device (1) according to claim 1, wherein the holding frame (2) further comprises at least one, preferably multiple, distance element (2g, 2h), wherein in the mounting position the distance element (2g) is disposed at least partially between the first optical element (5) and the second optical element (6) and/or between the first optical element (5) and the holding frame (2) and/or between the second optical element (6) and the holding frame (2), wherein the at least one distance element (2g, 2h) is configured to keep the gap between the first optical element (5) and the second optical element (6) and/or between the first optical element (5) and the holding frame (2) and/or between the second optical element (6) and the holding frame (2), constant along the longitudinal extension of the first optical element (5), the longitudinal extension of the second optical element (6), and/or the longitudinal extension of the holding frame (2).

3. The lighting device (1) according to claim 1, wherein the holding frame (2) is formed as a hollow body comprising an inner surface (2c), said inner surface (2c) faces the first optical element (5) and the second optical element (6) in the mounting position, and an outer surface (2e) opposite to the inner surface (2c), wherein the first receiving element (2d1) is disposed at the inner surface (2c) of the hollow body and the second receiving element (2d2) is disposed at the proximal end portion (2a).

4. The lighting device (1) according to claim 1, wherein the first contact surface (5e) is formed at the first protrusion (5d) of the first optical element (5) and the second contact surface (6e) is formed at the second protrusion (6d) of the second optical element (6).

5. The lighting device (1) according to claim 1, wherein the first receiving element (2d1) is formed as a groove along the longitudinal extension of the holding frame (2) and the second receiving element (2d2) is formed as a receiving recess formed at the proximal end portion (2a) of the holding frame (2), wherein the first protrusion (5d) of the first optical element (5) is formed corresponding to the groove, and the second protrusion (6d) of the second optical element (6) is formed corresponding to the receiving recess.

6. The lighting device (1) according to claim 1, wherein the light source holder (3) comprises at least two reference elements (3a, 3b) and the first optical element (5) and the second optical element (6) each comprise at least one counter reference element (5f, 6f) respectively, wherein each counter reference element (5f, 6f) is configured to engage with a corresponding reference element (3a, 3b) of the light source holder (3), such that in the mounting position the engagement of the reference elements (3a, 3b) with corresponding counter reference elements (5f, 6f) secure the position of the light source holder (3) relative to the first optical element (5) and the second optical element (6)

respectively, preferably such that the first optical element (5) receives light only from the first light source group (4a) and the second optical element (6) receives light only from the second light source group (4b).

7. The lighting device (1) according to claim 1, wherein the first light source group (4a) and/or the second light source group (4b) comprises two different types of light sources disposed alternating to each other on the light source holder (3), wherein a first light source type is configured to emit white light, wherein a second light source type is configured to emit non-white, in particular amber, light.

8. The lighting device (1) according to claim 1, wherein the light receiving surface (5a, 6a), the light emitting surface (5b, 6b) and the lateral surface (5c, 6c) of the first optical element (5) and/or the second optical element (6) form a transparent solid body respectively, wherein light received by the light receiving surface (5a, 6a) traverses within the solid body towards the light emitting surface (5b, 6b) via total internal reflection at the lateral surface (5c, 6c).

9. The lighting device (1) according to claim 1, wherein in the mounting position the holding frame (2) at least partially, preferably fully, surrounds the lateral surface (5c) of the first optical element (5) and/or the lateral surface (6c) of the second optical element (6).

10. The lighting device (1) according to claim 1, wherein the cover element (7) is configured as a cooling device, in particular a cooling plate, wherein in the mounting position the light source holder (3) is disposed between the cover element (7) and the first optical element (5) and the second optical element (6), wherein the cover element (7) is disposed at a light source averting backside of the light source holder (3) and is configured to cool the first light source group (4a) and the second light source group (4b).

11. The lighting device (1) according to claim 1, wherein in the mounting position the mounting means (7a) mount the cover element (7), and preferably the light source holder (3), to the holding frame (2), wherein the at least one second protrusion (6d) of the second optical element (6) comprises a through hole, wherein in the mounting position the mounting means (7a) extend from the cover element (7) through said through hole and into the receiving recess at the proximal end portion (2a) of the holding frame (2), wherein the receiving recess is configured to engage with the mounting means (7a) in order to fasten the position of the cover element (7), the second optical element (6), and preferably the light source holder (3), at the proximal end portion (2a) of the holding frame (2).

12. The lighting device (1) according to claim 1, wherein the light source holder (3) is mounted to the cover element (7), wherein the light source holder (3) comprises a, preferably flat, light source holding surface, to which the first light source group (4a) and the second light source group (4b) is mounted to, such that the first light source group (4a) and the second light source group (4b) are disposed in the same plane, wherein in the mounting position the light source holding surface is oriented essentially orthogonal to the main beam direction (x1).

13. The lighting device (1) according to claim 1, wherein in order to establish the mounting position, the first optical element (5) and the second optical element (6) are configured to be moveable relative to the holding frame (2), preferably insertable into a holding portion of the holding frame (2), along an insertion direction (x2), which is essentially parallel to the main beam direction (x1).

14. The lighting device (1) according to claim 1, wherein in the mounting position the light emitting surface (5b) of the first optical element (5) and the light emitting surface (6b) of the second optical element (6) are disposed essentially in the same plane.

15. A vehicle lamp, in particular a vehicle turn signal lamp, a vehicle headlamp or a vehicle taillamp, comprising a lighting device (1) according to claim 1.

* * * * *